US012757055B2

(12) United States Patent
Chi

(10) Patent No.: US 12,757,055 B2
(45) Date of Patent: Oct. 6, 2026

(54) BEAM MEASUREMENT METHOD AND APPARATUS, USER EQUIPMENT, NETWORK DEVICE, AND STORAGE MEDIUM

(71) Applicant: Beijing Xiaomi Mobile Software Co., Ltd., Beijing (CN)

(72) Inventor: Liangang Chi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 308 days.

(21) Appl. No.: 18/708,865

(22) PCT Filed: Nov. 15, 2021

(86) PCT No.: PCT/CN2021/130748

§ 371 (c)(1),
(2) Date: May 9, 2024

(87) PCT Pub. No.: WO2023/082279

PCT Pub. Date: May 19, 2023

(65) Prior Publication Data

US 2025/0031078 A1 Jan. 23, 2025

(51) Int. Cl.

*H04W 24/10* (2009.01)
*H04L 5/00* (2006.01)

(Continued)

(52) U.S. Cl.

CPC ........... *H04W 24/10* (2013.01); *H04L 5/0051* (2013.01); *H04W 36/08* (2013.01); *H04W 76/20* (2018.02)

(58) Field of Classification Search

CPC ..... H04W 24/10; H04W 36/08; H04W 76/20; H04W 36/0085; H04L 5/0051;

(Continued)

(56) References Cited

U.S. PATENT DOCUMENTS

2017/0359791 A1 12/2017 Onggosanusi et al.
2019/0075604 A1 3/2019 Wang et al.

(Continued)

FOREIGN PATENT DOCUMENTS

CN 109964436 A 7/2019
CN 107852630 B 8/2021

(Continued)

OTHER PUBLICATIONS

Extended European Search Report Issued in Application No. 21963725.3 dated Dec. 12, 2024, 9 pages.

(Continued)

*Primary Examiner* — Hoang-Chuong Q Vu
(74) *Attorney, Agent, or Firm* — Finnegan, Henderson, Farabow, Garrett & Dunner, L.L.P.

(57) ABSTRACT

A method for measuring a beam is performed by a User Equipment (UE). The method includes: obtaining configuration information sent by a base station; obtaining, based on the configuration information, at least one reference signal sent by the base station, determining a class value corresponding to the at least one reference signal, and performing beam measurement for the at least one reference signal to obtain a measurement result, wherein the class value is correlated with a beam bandwidth of the reference signal; and determining, based on at least one of the measurement result of the reference signal or the configuration information, a class value of an anchor reference signal, and performing at least one of the beam measurement or data reporting by anchoring on an anchor reference signal corresponding to the class value of the anchor reference signal.

20 Claims, 12 Drawing Sheets

(51) Int. Cl.
*H04W 36/08* (2009.01)
*H04W 76/20* (2018.01)

(58) Field of Classification Search
CPC . H04L 5/0048; H04B 7/0632; H04B 7/06952; H04B 7/088; H04B 17/309
See application file for complete search history.

(56) References Cited

U.S. PATENT DOCUMENTS

| | | | | |
|---|---|---|---|---|
| 2019/0123864 | A1 | 4/2019 | Zhang et al. | |
| 2021/0204266 | A1 | 7/2021 | Ahn et al. | |
| 2023/0072340 | A1* | 3/2023 | El Hamss | H04W 74/0808 |
| 2024/0007168 | A1* | 1/2024 | Goyal | H04B 7/024 |
| 2024/0085517 | A1* | 3/2024 | Duan | H04W 4/026 |

FOREIGN PATENT DOCUMENTS

| | | | |
|---|---|---|---|
| CN | 113383607 | A | 9/2021 |
| WO | WO 2020/205406 | A1 | 10/2020 |

OTHER PUBLICATIONS

International Search Report of International Application No. PCT/CN2021/130748, dated May 5, 2022, 4 pages.
Examination report for India Application No. 202427044838, dated Mar. 6, 2026, 11 pages.

* cited by examiner

BEAM MEASUREMENT METHOD AND APPARATUS, USER EQUIPMENT, NETWORK DEVICE, AND STORAGE MEDIUM

CROSS-REFERENCE

The present application is a U.S. National Stage of International Application No. PCT/CN2021/130748, filed on Nov. 15, 2021, the content of which is incorporated herein by reference in its entirety.

TECHNICAL FIELD

The present disclosure relates to the field of communication technologies, and in particular to a method and apparatus for measuring a beam, a user equipment, a network device and a storage medium.

BACKGROUND

In order to enrich frequency band resources, millimeter wave communication technologies and terahertz communication technologies are introduced in communication systems. In the related arts, when the millimeter wave communication technologies or the terahertz communication technologies are used for communication, it is usually necessary to measure and manage beams in communication processes.

SUMMARY

The present disclosure provides a method and apparatus for measuring a beam, a user equipment, a network device and a storage medium.

According to an aspect of embodiments of the present disclosure, there is provided a method for measuring a beam, which is applied to a User Equipment (UE). The method includes:

- obtaining configuration information sent by a base station;
- obtaining, based on the configuration information, at least one reference signal sent by the base station, determining a class value corresponding to the received at least one reference signal, and performing beam measurement for the at least one reference signal to obtain a measurement result; wherein the class value is positively or negatively correlated with a beam bandwidth of the reference signal; and
- determining, based on the measurement result of the reference signal and/or the configuration information, a class value of an anchor reference signal, and performing the beam measurement and/or data reporting by anchoring on an anchor reference signal corresponding to the class value of the anchor reference signal.

According to another aspect of embodiments of the present disclosure, there is provided a method for measuring a beam, which is applied to a base station. The method includes:

- sending configuration information;
- sending at least one reference signal, wherein the at least one reference signal has a corresponding class value, and the class value is positively or negatively correlated with a beam bandwidth of the reference signal; and
- obtaining data reported by a User Equipment (UE) on an anchor reference signal corresponding to the class value of the reference signal anchored by the UE.

According to still another aspect of embodiments of the present disclosure, there is provided a communication device, including a processor and a memory, wherein a computer program is stored in the memory, and the processor executes the computer program stored in the memory to cause the communication device to execute the method provided in the aspect of the above embodiments.

According to still another aspect of embodiments of the present disclosure, there is provided a communication device, including a processor and a memory, wherein a computer program is stored in the memory, and the processor executes the computer program stored in the memory to cause the communication device to execute the method provided in the other aspect of the above embodiments.

BRIEF DESCRIPTION OF THE DRAWINGS

The above and/or additional aspects and advantages of the present disclosure will become apparent and readily understood from the following description of embodiments with reference to the accompanying drawings, in which.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the embodiments of the present disclosure. Instead, they are merely examples of apparatuses and methods consistent with some aspects of embodiments of the present disclosure as recited in the appended claims.

The terms used in embodiments of the present disclosure are merely for the purpose of describing particular embodiments and are not intended to limit embodiments of the present disclosure. As used in embodiments of the present disclosure and the appended claims, the singular forms "a" and "the" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in embodiments of the present disclosure to describe various information, such information should not be limited to these terms. These terms are only used to distinguish the same type of information from each other. For example, without departing from the scope of embodiments of the present disclosure, the first indication information may also be referred to as the second information, and similarly, the second information may also be referred to as the first information. Depending on the context, the word "if" as used herein can be interpreted as "upon" or "when" or "in response to determination".

A method and apparatus for measuring a beam, a user equipment, a network device and a storage medium provided by embodiments of the present disclosure are described in detail below with reference to the accompanying drawings.

Figure 1:
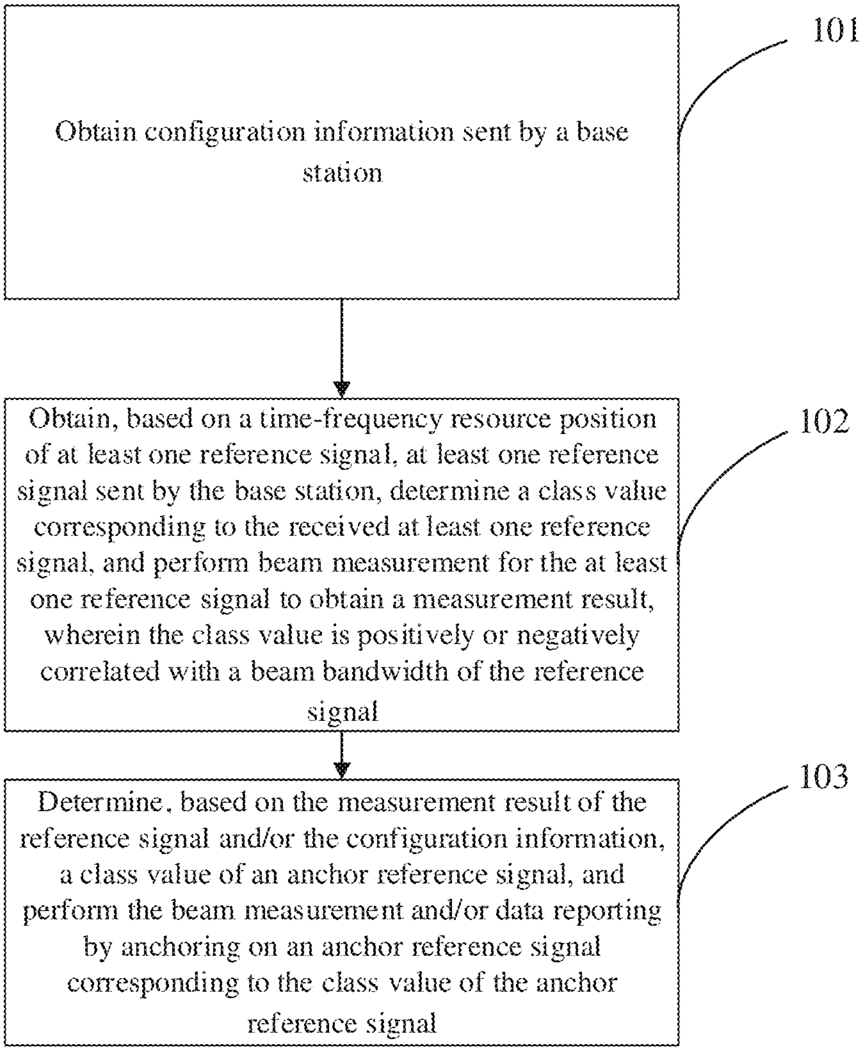
FIG. 1 is a schematic flowchart of a method for measuring a beam provided by an embodiment of the present disclosure.

FIG. 1 is a schematic flowchart of a method for measuring a beam provided by an embodiment of the present disclosure. The method is performed by a User Equipment (UE). As shown in FIG. 1, the method for measuring the beam may include steps 101 to 103.

In the step 101, configuration information sent by a base station is received.

In an embodiment of the present disclosure, the UE may refer to a device that provides speech and/or data connectivity for the user. The UE may communicate with one or more core networks via a Radio Access Network (RAN). The UE may be an Internet of Things terminal, such as a sensor device, a mobile phone (or a "cellular" phone), and a computer having an Internet of Things terminal, for example, a fixed, portable, pocket-sized, handheld, computer built-in or vehicle-mounted device. For example, it may be a station (STA), a subscriber unit, a subscriber station, a mobile station, a mobile, a remote station, an access point, a remote terminal, an access terminal, a user terminal, or a user agent. Alternatively, the UE may also be a device of an unmanned aerial vehicle. Alternatively, the UE may also be an in-vehicle device, for example, a trip computer with a wireless communication function, or a wireless terminal external to the trip computer. Alternatively, the UE may also be a roadside device, for example, a street light, a signal light, or other roadside device with a wireless communication function, etc.

In an embodiment of the present disclosure, the configuration information may include at least one of a time-frequency resource position of at least one reference signal for the beam measurement, a first target value of a beam quality, a second target value of the beam quality, a class value of a specified anchor reference signal, a reporting condition of the beam measurement, or a measurement quantity of the beam measurement sent by the base station.

In an embodiment of the present disclosure, the method of sending the configuration information may be:

- if the UE is in an idle state or an initial access state, the base station may send the configuration information to the UE by broadcasting system information; and
- if the UE is in a connected state, the base station may send the configuration information to the UE through a dedicated signaling.

In addition, it should be noted that in an embodiment of the present disclosure, the configuration information may also be determined by the UE based on a protocol agreement. Specifically, if the UE is in the idle state or the initial access state, the UE may determine the configuration information based on the protocol agreement.

In the step 102, at least one reference signal sent by the base station is obtained based on the configuration information, a class value corresponding to the received at least one reference signal is determined, and beam measurement is performed for the at least one reference signal to obtain a measurement result.

Specifically, in an embodiment of the present disclosure, the at least one reference signal sent by the base station may be obtained based on the time-frequency resource position of the at least one reference signal in the configuration information.

It should be noted that in an embodiment of the present disclosure, the class value corresponding to the reference signal may be positively correlated with a beam bandwidth of the reference signal. That is, a beam of a reference signal with a smaller class value is narrower than a beam of a reference signal with a larger class value.

In another embodiment of the present disclosure, the class value corresponding to the reference signal may be negatively correlated with the beam bandwidth of the reference signal. That is, the beam of the reference signal with the smaller class value is wider than the beam of the reference signal with the larger class value.

In an embodiment of the present disclosure, a correspondence between the class value and the beam bandwidth may be agreed by a protocol.

Further, in an embodiment of the present disclosure, the method for the UE to determine the class value corresponding to the received at least one reference signal may include:

- if the UE is in the idle state or the initial access state, the class value corresponding to the at least one reference signal is determined based on a protocol agreement; and
- if the UE is in the connected state, the class value of the at least one reference signal sent by the base station is obtained, and the class value of the at least one reference signal sent by the base station may be determined by the base station based on the protocol agreement.

In an embodiment of the present disclosure, reference signals of different classes correspond to different time domain resource positions.

Further, in an embodiment of the present disclosure, the measurement quantity of the beam measurement may include at least one of:

- a Reference Signal Receiving Power (RSRP);
- a Reference Signal Receiving Quality (RSRQ);
- a Signal to Interference plus Noise Ratio (SINR); or
- a Received Signal Strength Indication (RSSI).

In the step 103, a class value of an anchor reference signal is determined based on the measurement result of the reference signal and/or the configuration information, and the beam measurement and/or data reporting are performed by anchoring on an anchor reference signal corresponding to the class value of the anchor reference signal.

Specifically, in an embodiment of the present disclosure, when the class value of the anchor reference signal is determined based on the measurement result and/or the configuration information, a class value of a reference signal with a wider beam is preferably determined as the class value of the anchor reference signal on the premise of ensuring the beam quality. Therefore, when the beam measurement and/or the data reporting is subsequently performed for the anchor reference signal, not only the measurement quality of the beam can be ensured, but also a movable range of the UE is larger due to the wider beam bandwidth (that is, the larger coverage) corresponding to the anchor reference signal, further ensuring a service quality when the UE is in a moving state.

A specific method for determining the class value of the anchor reference signal in this embodiment will be introduced in detail in subsequent embodiments.

In an embodiment of the present disclosure, the method of performing the beam measurement and/or the data reporting by anchoring on the anchor reference signal corresponding to the class value of the anchor reference signal may include: based on the reporting condition of the beam measurement, performing, the beam measurement and/or the data reporting on a beam of the anchor reference signal, to the base station.

In an embodiment of the present disclosure, when the data reporting is performed to the base station on the beam of the anchor reference signal based on the reporting condition of the beam measurement, at least one of the following data may be reported:

a measurement result of the anchor reference signal;

a time domain resource position indication corresponding to the anchor reference signal; or the class value corresponding to the anchor reference signal.

In an embodiment of the present disclosure, only data that meets the reporting condition of the beam measurement may be reported to the base station.

To sum up, in the method for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

Figure 2:
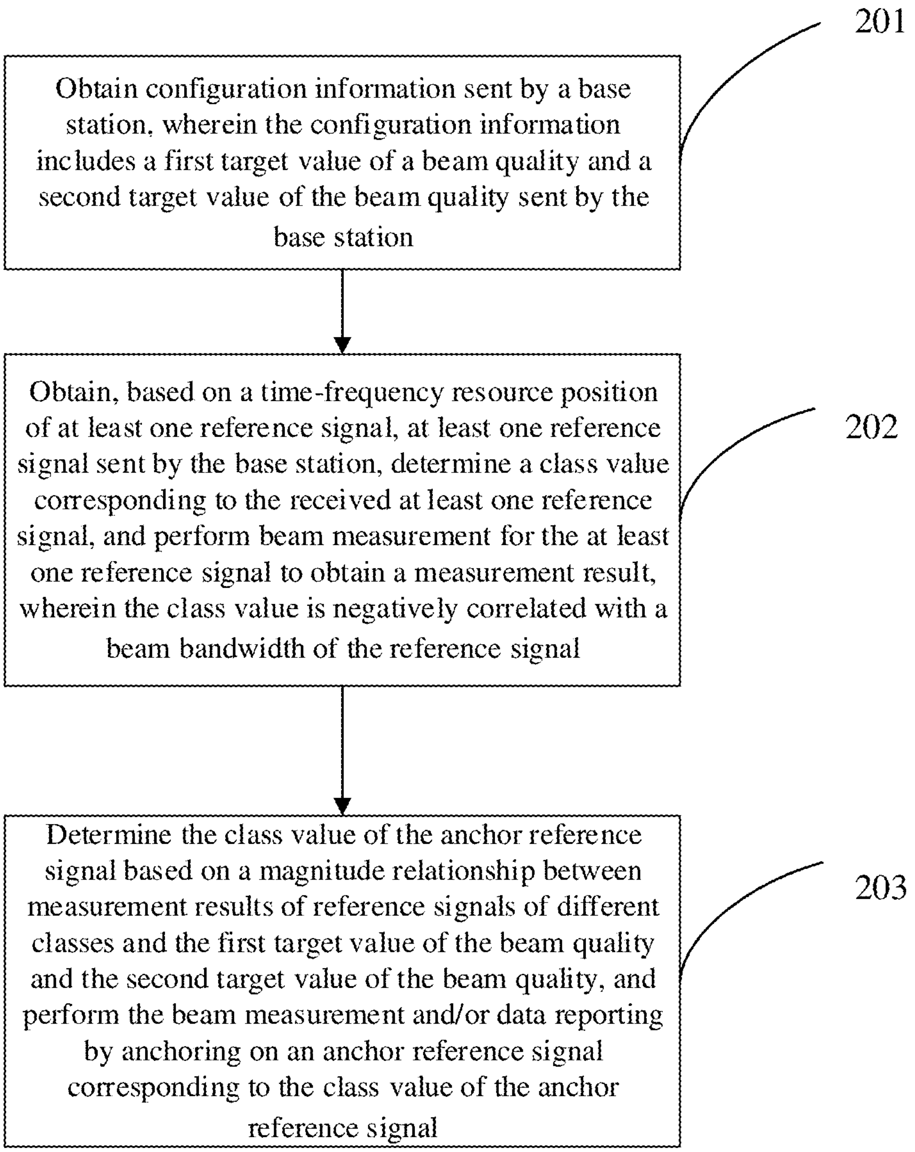
FIG. 2 is a schematic flowchart of a method for measuring a beam provided by another embodiment of the present disclosure.

FIG. 2 is a schematic flowchart of a method for measuring a beam provided by an embodiment of the present disclosure, and the method is performed by the UE. As shown in FIG. 2, the method for measuring the beam may include steps 201 to 203.

In the step 201, configuration information sent by a base station is obtained, and the configuration information includes a first target value of a beam quality and a second target value of the beam quality sent by the base station.

In an embodiment of the present disclosure, the first target value of the beam quality and the second target value of the beam quality may be preset, and the first target value of the beam quality may be smaller than the second target value of the beam quality. Further, for other relevant introductions about the configuration information, reference may be made to the description of the above embodiments, which will not be described in details here in the present disclosure.

In the step 202, at least one reference signal sent by the base station is obtained based on the configuration information, a class value corresponding to the received at least one reference signal is determined, and beam measurement is performed for the at least one reference signal to obtain a measurement result, the class value is negatively correlated with a beam bandwidth of the reference signal.

For the detailed introduction about the step 202, reference may be made to the description of the above embodiments, which is not described in details here in embodiments of the present disclosure.

In the step 203, a class value of an anchor reference signal is determined based on a magnitude relationship between measurement results of reference signals of different classes and the first target value of the beam quality and the second target value of the beam quality, and the beam measurement and/or data reporting are performed by anchoring on the anchor reference signal corresponding to the class value of the anchor reference signal.

In an embodiment of the present disclosure, the method of determining the class value of the anchor reference signal based on the magnitude relationship between the measurement results of the reference signals of different classes and the first target value of the beam quality and the second target value of the beam quality can include the following criterions.

Criterion 1: if there is a first reference signal among all reference signals whose measurement result is greater than or equal to the first target value of the beam quality and smaller than the second target value of the beam quality, a class value of the first reference signal is selected as the class value of the anchor reference signal. The first reference signal may include one or more reference signals.

Specifically, when the measurement result of the first reference signal is greater than the first target value of the beam quality and smaller than the second target value of the beam quality, it indicates that a beam quality corresponding to the first reference signal is better. On this basis, in an embodiment of the present disclosure, the class value of the first reference signal with the better beam quality may be directly selected as the class value of the anchor reference signal. In this case, when the beam measurement and/or the data reporting is subsequently performed on the anchor reference signal corresponding to the class value of the anchor reference signal, the beam measurement quality can be ensured.

In another embodiment of the present disclosure, the smallest class value in the first reference signal with the better beam quality may be selected as the class value of the anchor reference signal. Since the class value is negatively correlated with the beam bandwidth, a beam of a reference signal corresponding to the smallest class value in the first reference signal is the widest, that is, the beam quality corresponding to the anchor reference signal is better and the beam bandwidth corresponding to the anchor reference signal is wider. Therefore, when the beam measurements and/or the data reporting are subsequently performed on the beam of the anchor reference signal based on the class value of the anchor reference signal, not only the measurement quality of the beam can be ensured, but also the service quality when the UE is in the moving state can be ensured.

For example, in an embodiment of the present disclosure, the UE obtains a reference signal 1, a reference signal 2 and a reference signal 3 sent by the base station, the reference signal 1 corresponds to a class value of 1, the reference signal 2 corresponds to a class value of 2, and the reference signal 3 corresponds to a class value of 3. A measurement result corresponding to the reference signal 1 is smaller than the first target value of the beam quality, and measurement results corresponding to the reference signal 2 and the reference signal 3 are greater than the first target value of the beam quality and smaller than the second target value of the beam quality. In this case, class values 3 and 2 may be determined as the class value of the anchor reference signal, or only the class value of 2 may be determined as the class value of the anchor reference signal.

Criterion 2: if a measurement result of a reference signal with the largest class value is smaller than the first target value of the beam quality, a first operation is performed, and the first operation includes at least one of selecting the largest class value in all the reference signals as the class value of the anchor reference signal, performing cell reselection, or sending a handover request to the base station.

It should be noted that in an embodiment of the present disclosure, since the class value of the reference signal is negatively correlated with the beam bandwidth in this embodiment, the larger the class value of the reference signal, the narrower the beam bandwidth of the reference signal. It should be appreciated that the beam bandwidth is negatively correlated with the beam quality, that is, a beam quality of a beam with a narrower bandwidth is greater than a beam quality of a beam with a wider bandwidth, and the beam bandwidth is positively correlated with the service quality when the UE is in the moving state, that is, the wider the bandwidth of the beam, the larger the coverage of the beam, the better mobility of the UE that can be supported.

In this case, if the measurement result of the reference signal with the largest class value is smaller than the first target value of the beam quality, it indicates that measurement results of all the reference signals are smaller than the first target value of the beam quality, that is, beam qualities of all the reference signals are poor. On this basis, in an embodiment of the present disclosure, the UE may select the largest class value in the reference signals as the class value of the anchor reference signal, that is, when the beam qualities of all the reference signals are poor, the class value of the reference signal with the relatively best beam quality among the reference signals with the poor beam qualities is determined as the class value of the anchor reference signal, so as to ensure that when the beam measurement and/or the data reporting are subsequently performed on the anchor reference signal, the measurement quality of the beam can be ensured. In another embodiment of the present disclosure, the UE may also not determine the class value of the anchor reference signal, but directly perform the cell reselection and/or send the handover request to the base station in order to re-obtain a reference signal with a better beam quality.

Criterion 3: if a measurement result of a reference signal with the smallest class value is greater than or equal to the second target value of the beam quality, the smallest class value in all the reference signals is selected as the class value of the anchor reference signal.

Specifically, in an embodiment of the present disclosure, based on the foregoing description, it can be known that in the case of "the class value of the reference signal being negatively correlated with the beam bandwidth", if the measurement result of the reference signal with the smallest class value is greater than or equal to the second target value of the beam quality, it indicates that the measurement results of all the reference signals are greater than or equal to the second target value of the beam quality, that is, the beam qualities of all the reference signals are good. In this case, in an embodiment of the present disclosure, the UE may select the minimum class value in all the reference signals as the class value of the anchor reference signal, that is, when the beam qualities of all the reference signals are good, a class value of a reference signal with the widest beam bandwidth is preferably determined as the class value of the anchor reference signal. Therefore, when the beam measurement and/or the data reporting are subsequently performed on the anchor reference signal corresponding to the class value of the anchor reference signal, the measurement quality of the beam can be ensured, and the service quality when the UE is in the moving state can be ensured.

In addition, for other introductions about the step 203, reference may be made to the description of the above embodiments, which will not be described in details here in embodiments of the present disclosure.

Furthermore, this embodiment only takes "the class value corresponding to the reference signal being negatively correlated with the beam bandwidth" as an example for illustration. In another embodiment of the present disclosure, the class value corresponding to the reference signal may also be positively correlated with the beam bandwidth. When the class value is positively correlated with the beam bandwidth of the reference signal, the method of determining the class value of the anchor reference signal based on the magnitude relationship between the measurement results of the reference signals of different classes and the first target value of the beam quality and the second target value of the beam quality may include:

- if there is a first reference signal among all reference signals whose measurement result is greater than or equal to the first target value of the beam quality and smaller than the second target value of the beam quality, selecting a class value of the first reference signal as the class value of the anchor reference signal;
- if a measurement result of a reference signal with the smallest class value is smaller than the first target value of the beam quality, performing a second operation, and the second operation includes at least one of selecting the smallest class value in all the reference signals as the class value of the anchor reference signal, performing cell reselection, or sending a handover request to the base station; and
- if a measurement result of a reference signal with the largest class value is greater than or equal to the second target value of the beam quality, selecting the largest class value in all the reference signals as the class value of the anchor reference signal.

Specifically, determination criterions for the class value of the anchor reference signal in a case where "the class value corresponding to the reference signal is positively correlated with the beam bandwidth" are the same as those in a case where "the class value corresponding to the reference signal is negatively correlated with the beam bandwidth", which are both that on the premise of ensuring the beam quality, the service quality when the UE is in the moving state is further ensured, which will not be described in details here in embodiments of the present disclosure.

To sum up, in the method for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

Figure 3:
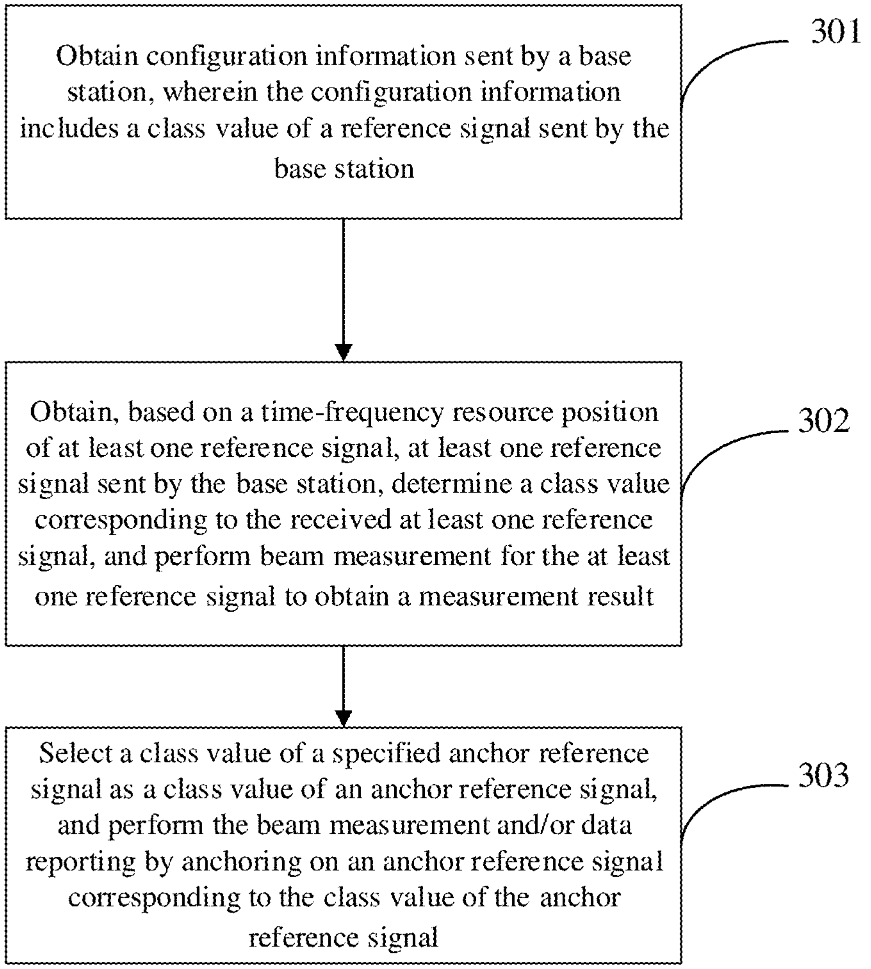
FIG. 3 is a schematic flowchart of a method for measuring a beam provided by yet another embodiment of the present disclosure.

FIG. 3 is a schematic flowchart of a method for measuring a beam provided by an embodiment of the present disclosure, and the method is performed by the UE. As shown in FIG. 3, the method for measuring the beam may include steps 301 to 303.

In the step 301, configuration information sent by a base station is obtained, and the configuration information includes a class value of an anchor reference signal specified by the base station.

In an embodiment of the present disclosure, the class value of the specified anchor reference signal may be determined by the base station.

In the step 302, at least one reference signal sent by the base station is obtained based on a time-frequency resource position of the at least one reference signal, a class value corresponding to the received at least one reference signal is determined, and beam measurement is performed for the at least one reference signal to obtain a measurement result.

In the step 303, the class value of the specified anchor reference signal is selected as a class value of an anchor reference signal, and the beam measurement and/or data reporting are performed by anchoring on an anchor reference signal corresponding to the class value of the anchor reference signal.

For example, in an embodiment of the present disclosure, assuming that the class value of the specified anchor reference signal is a class value of 3, the UE obtains the reference signal 1, the reference signal 2 and the reference signal 3, the reference signal 1 corresponds to the class value of 1, the reference signal 2 corresponds to the class value of 2, and the reference signal 3 corresponds to the class value of 3. In this case, the beam measurement and/or the data reporting may be performed directly on the reference signal 3.

In addition, for the detailed introduction about the steps 301 to 303, reference may be made to the description of the above embodiments, which is not described in details here in embodiments of the present disclosure.

To sum up, in the method for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

Figure 4:
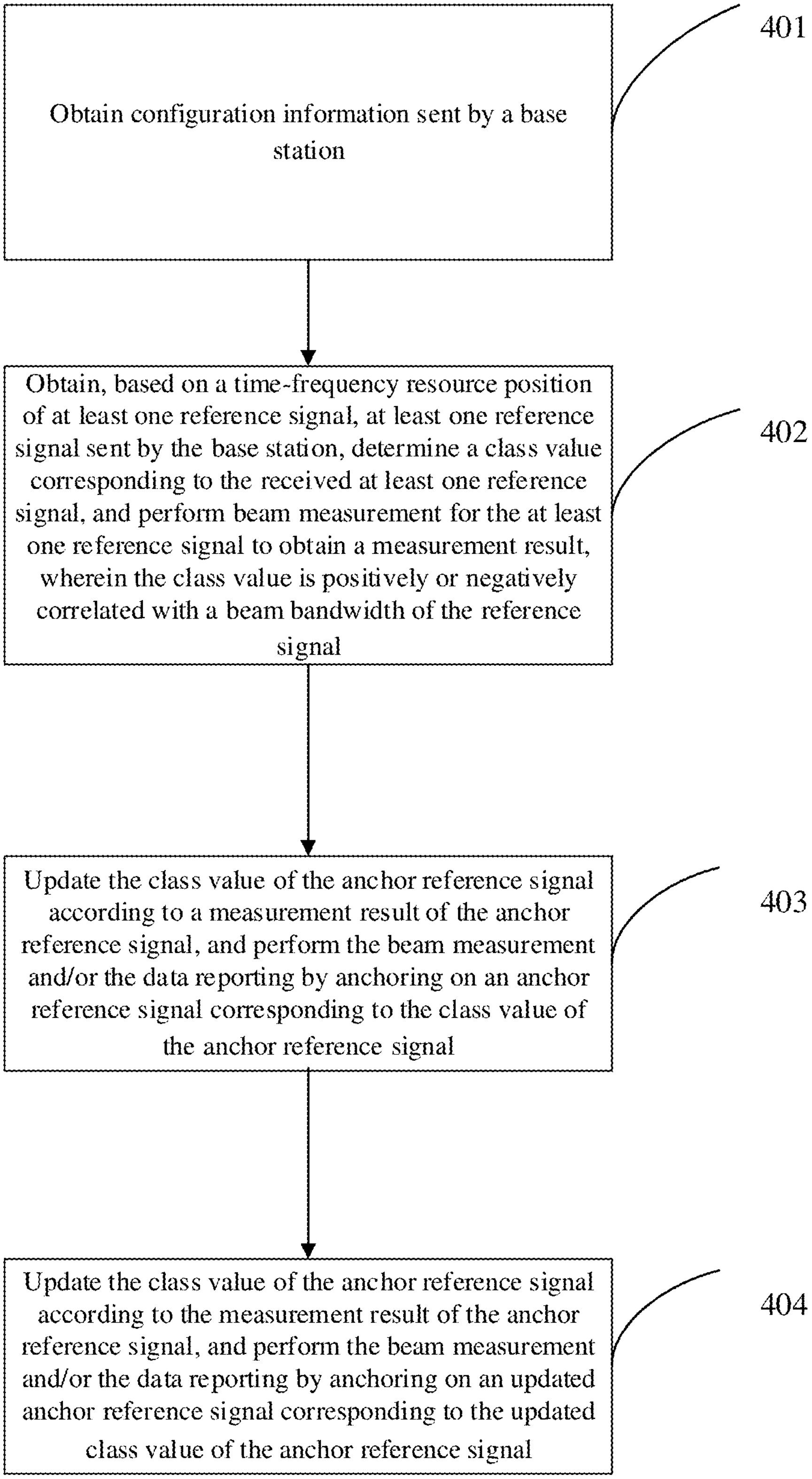
FIG. 4 is a schematic flowchart of a method for measuring a beam provided by still another embodiment of the present disclosure.

FIG. 4 is a schematic flowchart of a method for measuring a beam provided by an embodiment of the present disclosure, and the method is performed by the UE. As shown in FIG. 4, the method for measuring the beam may include steps 401 to 404.

In the step 401, configuration information sent by a base station is obtained.

In an embodiment of the present disclosure, the configuration information includes at least one of a time-frequency resource position of at least one reference signal for the beam measurement, a first target value of a beam quality, a second target value of the beam quality, a class value of a specified anchor reference signal, a reporting condition of the beam measurement, or a measurement quantity of the beam measurement sent by the base station.

In the step 402, at least one reference signal sent by the base station is obtained based on a time-frequency resource position of the at least one reference signal, a class value corresponding to the received at least one reference signal is determined, and beam measurement is performed for the at least one reference signal to obtain a measurement result, the class value is negatively correlated with a beam bandwidth of the reference signal.

In the step 403, a class value of an anchor reference signal is determined based on a measurement result of the reference signal and/or the configuration information, and the beam measurement and/or data reporting are performed by anchoring on an anchor reference signal corresponding to the class value of the anchor reference signal.

For the detailed introduction about the steps 401 to 403, reference may be made to the description of the above embodiments, which is not described in details here in embodiments of the present disclosure.

In the step 404, the class value of the anchor reference signal is updated according to a measurement result of the anchor reference signal, and the beam measurement and/or the data reporting are performed by anchoring on an updated anchor reference signal corresponding to the updated class value of the anchor reference signal.

In an embodiment of the present disclosure, after the anchor reference signal is determined, the beam quality of the anchor reference signal may change due to some reasons (such as the movement of the UE). In this case, it is necessary to update the anchor reference signal according to the measurement result of the anchor reference signal.

In an embodiment of the present disclosure, the method of updating the class value of the anchor reference signal according to the measurement result of the anchor reference signal may include:

updating the anchor reference signal based on a magnitude relationship between the measurement result of the anchor reference signal and the first target value of the beam quality and the second target value of the beam quality.

Specifically, in an embodiment of the present disclosure, if the measurement result of the anchor reference signal is greater than or equal to the second target value of the beam quality, the class value of the anchor reference signal is updated, and the class value of the anchor reference signal after the update is smaller than the class value of the anchor reference signal before the update. If the measurement result of the anchor reference signal is smaller than the first target value of the beam quality, the class value of the anchor reference signal is updated, and the class value of the anchor reference signal after the update is greater than the class value of the anchor reference signal before the update.

It should be noted that in an embodiment of the present disclosure, when the measurement result of the anchor reference signal is greater than or equal to the second target value of the beam quality, it indicates that the beam qualities of all the current reference signals are better than before. In this case, the anchor reference signal may be updated to a reference signal with a smaller class value, that is, the class value of the anchor reference signal after the update is smaller than the class value of the anchor reference signal before the update. Then, based on the class value of the reference signal being negatively correlated with the beam bandwidth, the beam bandwidth of the anchor reference signal after the update is greater than the beam bandwidth of the anchor reference signal before the update. When the beam measurement and/or the data reporting are subsequently performed on the updated anchor reference signal, the service quality when the UE is in the moving state can be further ensured.

Further, in an embodiment of the present disclosure, when the measurement result of the anchor reference signal is smaller than the first target value of the beam quality, it indicates that the beam qualities of all the current reference signals are worse than before. In this case, since the beam quality of the reference signal with the narrower beam bandwidth is greater than the beam quality of the reference signal with the wider beam bandwidth, the anchor reference signal may be updated to a reference signal with a larger class value, that is, the class value of the anchor reference signal after the update is greater than the class value of the anchor reference signal before the update. Based on the class value of the reference signal being negatively correlated with the beam bandwidth, the beam bandwidth of the anchor reference signal after the update is smaller than the beam bandwidth of the anchor reference signal before the update, that is, the beam quality of the anchor reference signal after the update is higher than the beam quality of the anchor reference signal before the update. When the beam measurement and/or the data reporting are subsequently performed on the updated anchor reference signal, the measurement quality of the beam can be ensured.

For example, in an embodiment of the present disclosure, it is assumed that the UE obtains the reference signal 1, the reference signal 2, and the reference signal 3 sent by the base station, the class value of the reference signal 1 is 1, the class value of the reference signal 2 is 2, the class value of the reference signal 3 is 3, and the anchor reference signal is the reference signal 2. If it is detected that the anchor reference signal is greater than or equal to the second target value of the beam quality, the reference signal 1 may be determined as the updated anchor reference signal. If it is detected that the anchor reference signal is smaller than the first target value of the beam quality, the reference signal 3 may be determined as the updated anchor reference signal.

In addition, in an embodiment of the present disclosure, the method of performing the data reporting by anchoring on the anchor reference signal corresponding to the updated class value of the anchor reference signal may include:

based on the reporting condition of the beam measurement, reporting on a beam of the updated anchor reference signal, at least one of the following data to the base station:

a measurement result of the updated anchor reference signal;

a time domain resource position indication corresponding to the updated anchor reference signal; or a class value of the updated anchor reference signal.

In an embodiment of the present disclosure, only data that meets the reporting condition of the beam measurement may be reported to the base station.

In addition, it should be noted that this embodiment only takes "the class value corresponding to the reference signal being negatively correlated with the beam bandwidth" as an example for illustration. In another embodiment of the present disclosure, the class value corresponding to the reference signal may also be positively correlated with the beam bandwidth. When the class value is positively correlated with the beam bandwidth of the reference signal, the method of updating the anchor reference signal based on the magnitude relationship between the measurement result of the anchor reference signal and the first target value of the beam quality and the second target value of the beam quality may include:

if the measurement result of the anchor reference signal is greater than or equal to the second target value of the beam quality, updating the class value of the anchor reference signal, and the class value of the anchor reference signal after the update is greater than the class value of the anchor reference signal before the update; and if the measurement result of the anchor reference signal is smaller than the first target value of the beam quality, updating the class value of the anchor reference signal, and the class value of the anchor reference signal after the update is smaller than the class value of the anchor reference signal before the update.

Specifically, update criterions for the class value of the anchor reference signal in a case where "the class value corresponding to the reference signal is positively correlated with the beam bandwidth" are similar to update criterions in a case where "the class value corresponding to the reference signal is negatively correlated with the beam bandwidth", which are both that on the premise of ensuring the beam quality, the service quality when the UE is in the moving state is further ensured, which is not described in details here in embodiments of the present disclosure.

To sum up, in the method for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

Figure 5:
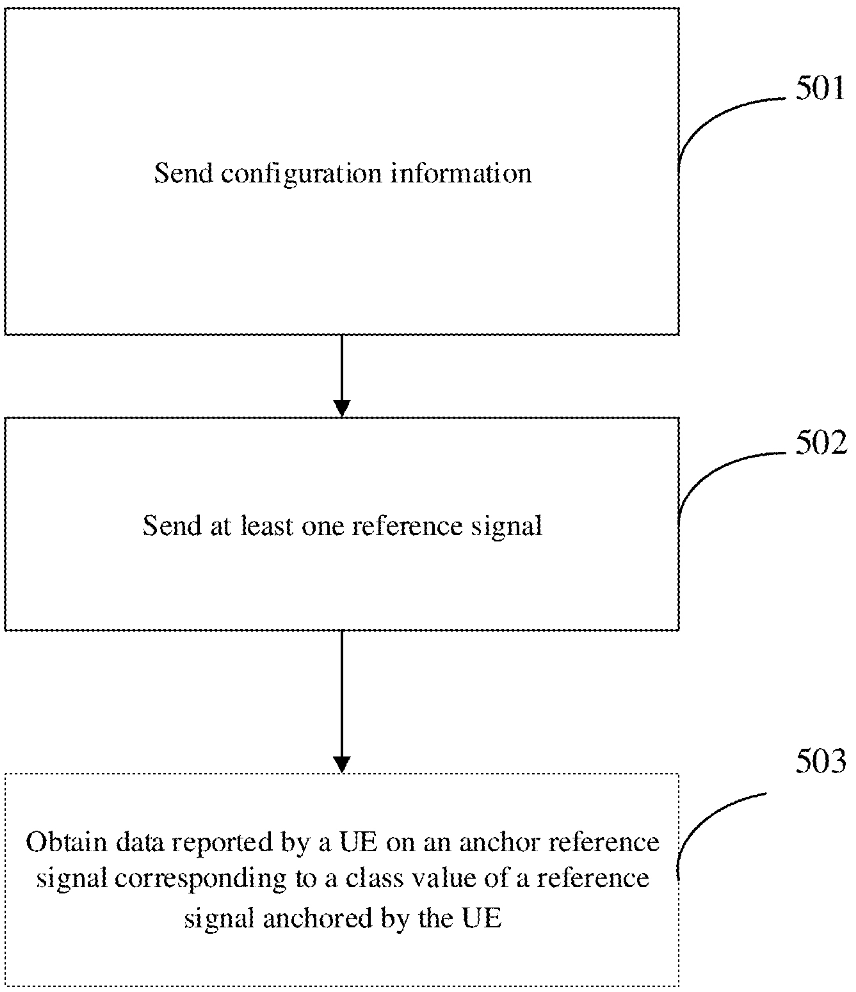
FIG. 5 is a schematic flowchart of a method for measuring a beam provided by still another embodiment of the present disclosure.

FIG. 5 is a schematic flowchart of a method for measuring a beam provided by an embodiment of the present disclosure, and the method is performed by the base station. As shown in FIG. 5, the method for measuring the beam may include steps 501 to 503.

In the step 501, configuration information is sent.

In an embodiment of the present disclosure, the configuration information may include at least one of a time-frequency resource position of at least one reference signal for the beam measurement, a first target value of a beam quality, a second target value of the beam quality, a class value of a specified anchor reference signal, a reporting condition of the beam measurement, or a measurement quantity of the beam measurement sent by the base station.

Further, in an embodiment of the present disclosure, the measurement quantity of the beam measurement includes at least one of:

a RSRP;

a RSRQ;

a SINR; or a RSSI.

In addition, in an embodiment of the present disclosure, the method for the base station to send the configuration information to the UE may include:

when the UE is in an idle state or an initial access state, the base station sends the configuration information to the UE by broadcasting system information; and when the UE is in a connected state, the base station sends the configuration information to the UE through a signaling.

Moreover, in an embodiment of the present disclosure, before sending the configuration information, the base station may also first determine a time-frequency resource position of the reference signal used for the beam measurement. In an embodiment of the present disclosure, determining the time-frequency resource position of the reference signal for the beam measurement may include the following steps:

determining, based on a protocol agreement, a candidate time-frequency resource position corresponding to the reference signal; and determining a time-frequency resource position of each reference signal from the candidate time-frequency resource position.

In the step 502, at least one reference signal is sent.

In an embodiment of the present disclosure, the base station may send the at least one reference signal to the UE based on the time domain resource position determined in the step 501. The at least one reference signal has a corresponding class value, and the class value is positively or negatively correlated with the beam bandwidth of the reference signal.

In the step 503, data reported by the UE is obtained on an anchor reference signal corresponding to a class value of a reference signal anchored by the UE.

In an embodiment of the present disclosure, the method of obtaining the data reported by the UE includes at least one of:

obtaining a measurement result of the anchor reference signal reported by the UE;

obtaining a time domain resource position indication corresponding to the anchor reference signal reported by the UE; or obtaining a class value of the anchor reference signal.

In addition, for other detailed introduction about the steps 501 to 503, reference may be made to the description of the above embodiments, which will not be described in details here in embodiments of the present disclosure.

To sum up, in the method for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

Figure 6:
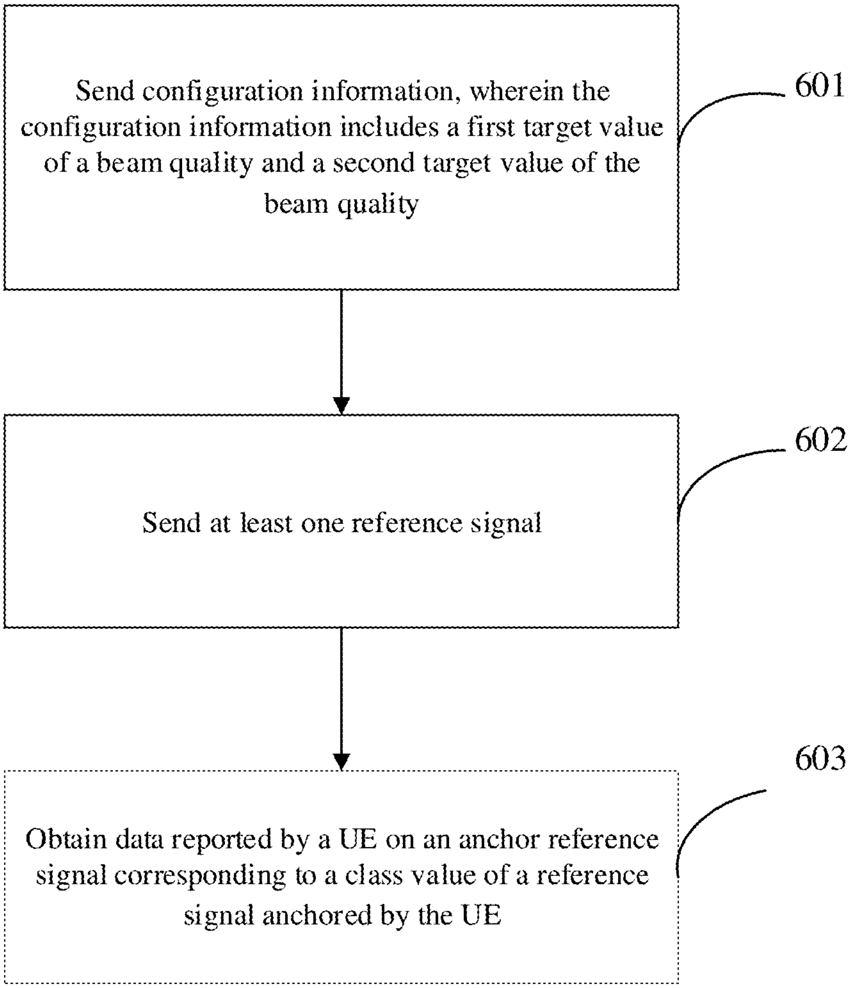
FIG. 6 is a schematic flowchart of a method for measuring a beam provided by still another embodiment of the present disclosure.

FIG. 6 is a schematic flowchart of a method for measuring a beam provided by an embodiment of the present disclosure, and the method is performed by the base station. As shown in FIG. 6, the method for measuring the beam may include steps 601 to 603.

In the step 601, configuration information is sent, and the configuration information includes a first target value of a beam quality and a second target value of the beam quality.

In the step 602, at least one reference signal is sent, the at least one reference signal has a corresponding class value, and the class value is negatively correlated with a beam bandwidth of the reference signal.

In the step 603, data reported by the UE is obtained on an anchor reference signal corresponding to a class value of a reference signal anchored by the UE.

To sum up, in the method for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

Figure 7:
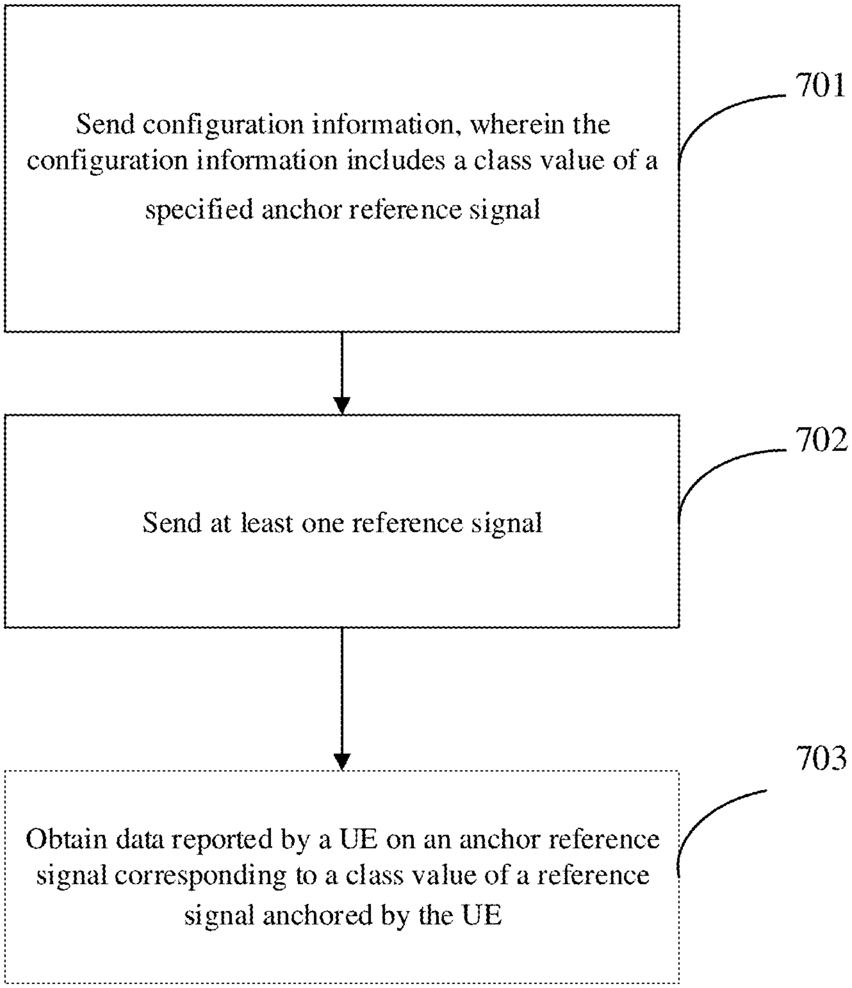
FIG. 7 is a schematic flowchart of a method for measuring a beam provided by still another embodiment of the present disclosure.

FIG. 7 is a schematic flowchart of a method for measuring a beam provided by an embodiment of the present disclosure, and the method is performed by the base station. As shown in FIG. 7, the method for measuring the beam may include steps 701 to 703.

In the step 701, configuration information is sent, and the configuration information includes a class value of a specified anchor reference signal.

In the step 702, at least one reference signal is sent, the at least one reference signal has a corresponding class value, and the class value is negatively correlated with a beam bandwidth of the reference signal.

In the step 703, data reported by the UE is obtained on an anchor reference signal corresponding to a class value of a reference signal anchored by the UE.

To sum up, in the method for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

Figure 8:
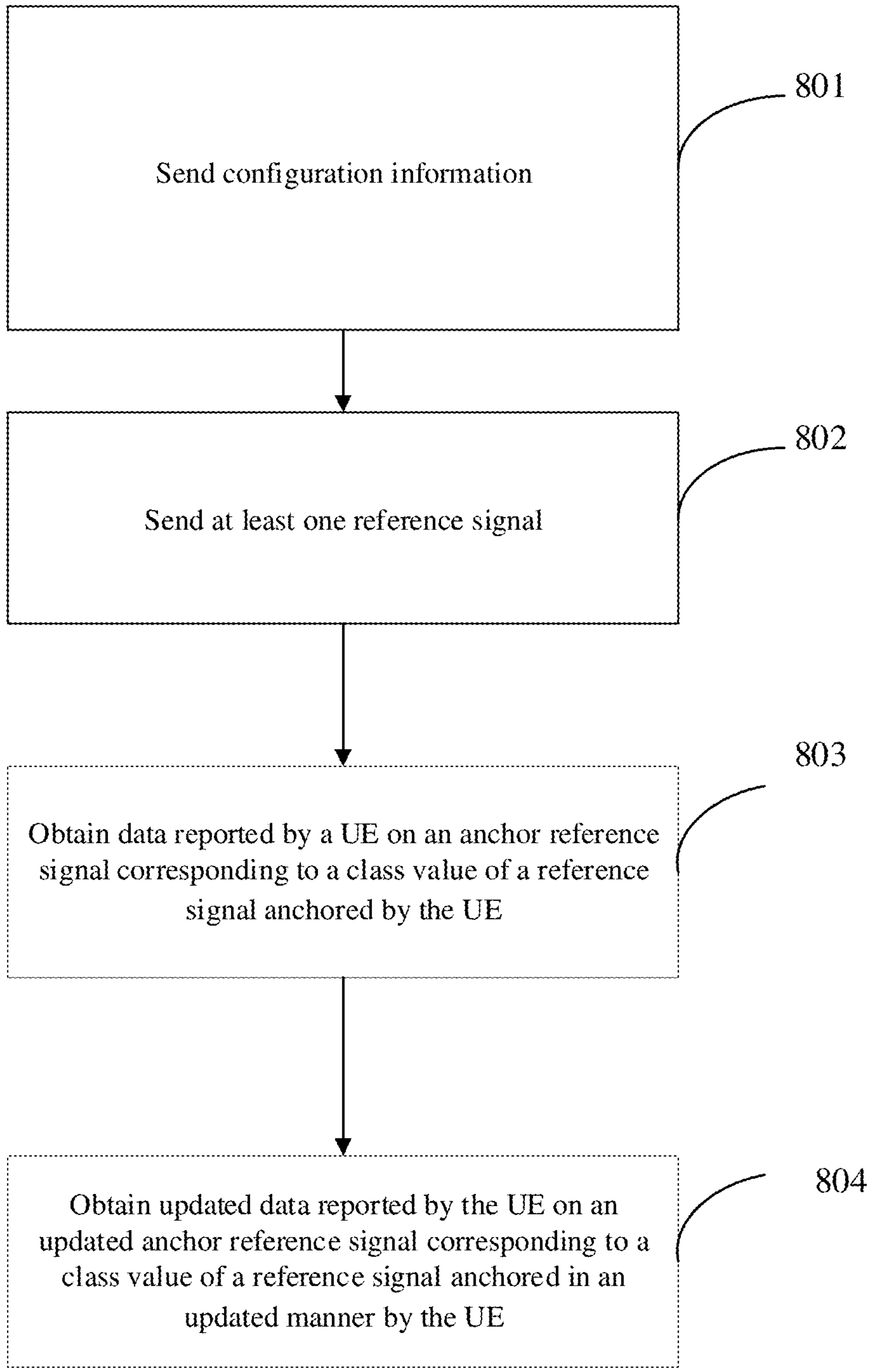
FIG. 8 is a schematic flowchart of a method for measuring a beam provided by still another embodiment of the present disclosure.

FIG. 8 is a schematic flowchart of a method for measuring a beam provided by an embodiment of the present disclosure, and the method is performed by the base station. As shown in FIG. 8, the method for measuring the beam may include steps 801 to 804.

In the step 801, configuration information is sent.

In the step 802, at least one reference signal is sent, the at least one reference signal has a corresponding class value, and the class value is negatively correlated with a beam bandwidth of the reference signal.

In the step 803, data reported by the UE is obtained on an anchor reference signal corresponding to a class value of a reference signal anchored by the UE.

In the step 804, updated data reported by the UE is obtained on an updated anchor reference signal corresponding to the class value of the reference signal anchored in an updated manner by the UE.

In an embodiment of the present disclosure, the method of obtaining the updated data reported by the UE may include at least one of:

- obtaining a measurement result of the updated anchor reference signal reported by the UE;
- obtaining a time domain resource position indication corresponding to the updated anchor reference signal reported by the UE; or
- obtaining a class value of the updated anchor reference signal reported by the UE.

To sum up, in the method for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

Figure 9:
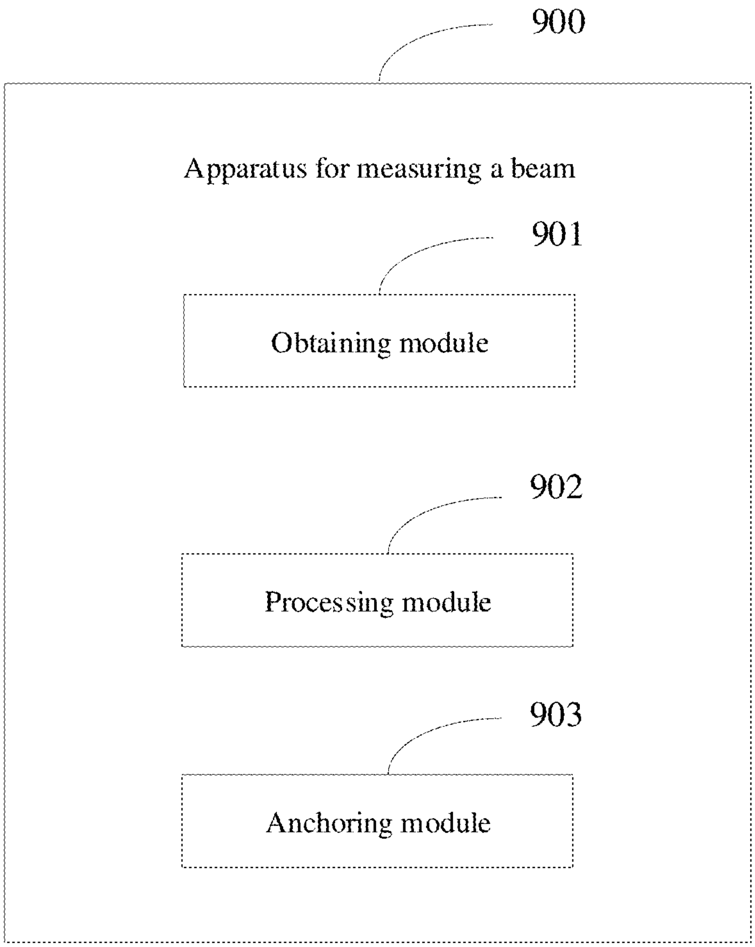
FIG. 9 is a schematic structural diagram of an apparatus for measuring a beam provided by an embodiment of the present disclosure.

FIG. 9 is a schematic structural diagram of an apparatus 900 for measuring a beam provided by an embodiment of the present disclosure. As shown in FIG. 9, the apparatus 900 for measuring the beam may include:

an obtaining module 901, configured to obtain configuration information sent by a base station;

a processing module 902, configured to obtain, based on the configuration information, at least one reference signal sent by the base station, determine a class value corresponding to the received at least one reference signal, and perform beam measurement for the at least one reference signal to obtain a measurement result; wherein the class value is positively or negatively correlated with a beam bandwidth of the reference signal; and an anchoring module 903, configured to determine, based on the measurement result of the reference signal and/or the configuration information, a class value of an anchor reference signal, and perform the beam measurement and/or data reporting by anchoring on an anchor reference signal corresponding to the class value of the anchor reference signal.

To sum up, in the apparatus for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

In an embodiment of the present disclosure, the configuration information includes at least one of a time-frequency resource position of the at least one reference signal for the beam measurement, a first target value of a beam quality, a second target value of the beam quality, a class value of a specified anchor reference signal, a reporting condition of the beam measurement, or a measurement quantity of the beam measurement sent by the base station.

In an embodiment of the present disclosure, the processing module is further configured to:

obtain, based on the time-frequency resource position of the at least one reference signal, the at least one reference signal sent by the base station.

In an embodiment of the present disclosure, the processing module is further configured to:

if the UE is in an idle state or an initial access state, determine the class value corresponding to the at least one reference signal based on a protocol agreement; and if the UE is in a connected state, obtain the class value of the at least one reference signal sent by the base station.

In an embodiment of the present disclosure, the anchoring module is further configured to:

determine the class value of the anchor reference signal based on a magnitude relationship between measurement results of reference signals of different classes and the first target value of the beam quality and the second target value of the beam quality.

In an embodiment of the present disclosure, the class value is negatively correlated with the beam bandwidth of the reference signal, and the anchoring module is further configured to:

if a first reference signal among all reference signals whose measurement result is greater than or equal to the first target value of the beam quality and smaller than the second target value of the beam quality exists, select a class value of the first reference signal as the class value of the anchor reference signal;

if a measurement result of a reference signal with a largest class value is smaller than the first target value of the beam quality, perform a first operation, wherein the first operation includes at least one of selecting the largest class value in all the reference signals as the class value of the anchor reference signal, performing cell reselection, or sending a handover request to the base station; and if a measurement result of a reference signal with a smallest class value is greater than or equal to the second target value of the beam quality, select the smallest class value in all the reference signals as the class value of the anchor reference signal.

In an embodiment of the present disclosure, the class value is positively correlated with the beam bandwidth of the reference signal, and the anchoring module is further configured to:

if a first reference signal among all reference signals whose measurement result is greater than or equal to the first target value of the beam quality and smaller than the second target value of the beam quality exists, select a class value of the first reference signal as the class value of the anchor reference signal;

if a measurement result of a reference signal with a smallest class value is smaller than the first target value of the beam quality, perform a second operation, wherein the second operation includes at least one of selecting the smallest class value in all the reference signals as the class value of the anchor reference signal, performing cell reselection, or sending a handover request to the base station; and if a measurement result of a reference signal with a largest class value is greater than or equal to the second target value of the beam quality, select the largest class value in all the reference signals as the class value of the anchor reference signal.

In an embodiment of the present disclosure, the anchoring module is further configured to:

select the class value of the specified anchor reference signal as the class value of the anchor reference signal.

In an embodiment of the present disclosure, the anchoring module is further configured to:

based on the reporting condition of the beam measurement, report, on a beam of the anchor reference signal, at least one of the following data to the base station:

a measurement result of the anchor reference signal;

a time domain resource position indication corresponding to the anchor reference signal; or the class value of the anchor reference signal.

In an embodiment of the present disclosure, the apparatus is further configured to:

update the class value of the anchor reference signal according to a measurement result of the anchor reference signal, and perform the beam measurement and/or the data reporting by anchoring on an updated anchor reference signal corresponding to the updated class value of the anchor reference signal.

In an embodiment of the present disclosure, the apparatus is further configured to:

update the anchor reference signal based on a magnitude relationship between the measurement result of the anchor reference signal and a first target value of a beam quality and a second target value of the beam quality.

In an embodiment of the present disclosure, the class value is negatively correlated with the beam bandwidth of the reference signal, and the apparatus is further configured to:

if the measurement result of the anchor reference signal is greater than or equal to the second target value of the beam quality, update the class value of the anchor reference signal, wherein the class value of the anchor reference signal after the updating is smaller than the class value of the anchor reference signal before the updating; and if the measurement result of the anchor reference signal is smaller than the first target value of the beam quality, update the class value of the anchor reference signal, wherein the class value of the anchor reference signal after the updating is greater than the class value of the anchor reference signal before the updating.

In an embodiment of the present disclosure, the class value is positively correlated with the beam bandwidth of the reference signal, and the apparatus is further configured to:

if the measurement result of the anchor reference signal is greater than or equal to the second target value of the beam quality, update the class value of the anchor reference signal, wherein the class value of the anchor reference signal after the updating is greater than the class value of the anchor reference signal before the updating; and if the measurement result of the anchor reference signal is smaller than the first target value of the beam quality, update the class value of the anchor reference signal, wherein the class value of the anchor reference signal after the updating is smaller than the class value of the anchor reference signal before the updating.

In an embodiment of the present disclosure, the apparatus is further configured to:

based on a reporting condition of the beam measurement, report, on a beam of the updated anchor reference signal, at least one of the following data to the base station:

a measurement result of the updated anchor reference signal;

a time domain resource position indication corresponding to the updated anchor reference signal; or a class value of the updated anchor reference signal.

In an embodiment of the present disclosure, the measurement quantity of the beam measurement includes at least one of:

a RSRP;

a RSRQ;

a SINR; or a RSSI.

Figure 10:
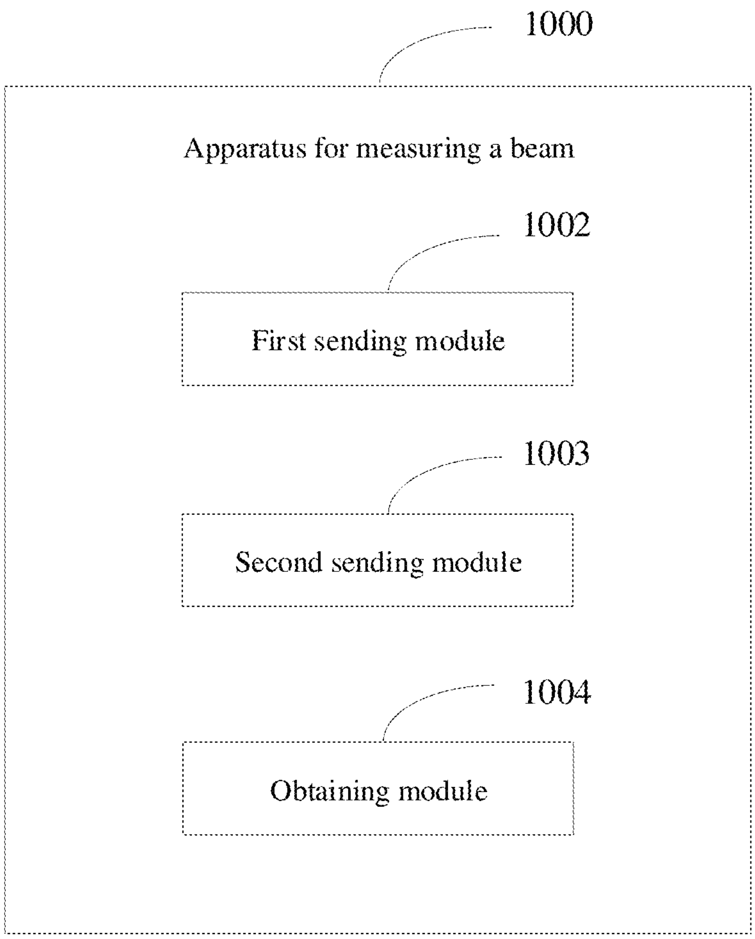
FIG. 10 is a schematic structural diagram of an apparatus for measuring a beam provided by another embodiment of the present disclosure.

FIG. 10 is a schematic structural diagram of an apparatus 1000 for measuring a beam provided by an embodiment of the present disclosure. As shown in FIG. 10, the apparatus 1000 for measuring the beam may include:

a first sending module 1002, configured to send configuration information;

a second sending module 1003, configured to send at least one reference signal, wherein the class value is positively or negatively correlated with a beam bandwidth of the reference signal; and an obtaining module 1004, configured to obtain data reported by a User Equipment (UE) on an anchor reference signal corresponding to the class value of the reference signal anchored by the UE.

To sum up, in the apparatus for measuring the beam provided by embodiments of the present disclosure, the UE may obtain the configuration information sent by the base station, and may obtain, based on the configuration information, the at least one reference signal sent by the base station, determine the class value corresponding to the received at least one reference signal, and perform the beam measurement for the at least one reference signal to obtain the measurement result. The class value is positively or negatively correlated with the beam bandwidth of the reference signal. Thereafter, the UE may determine, based on the measurement result of the reference signal and/or the configuration information, the class value of the anchor reference signal, and perform the beam measurement and/or the data reporting by anchoring on the anchor reference signal corresponding to the class value of the anchor reference signal. Therefore, in embodiments of the present disclosure, the UE may determine the class value of the anchor reference signal based on its measurement result for the at least one reference signal sent by the base station and/or the configuration information sent by the base station, and may subsequently perform the beam measurement and/or the data reporting by anchoring on the anchor reference signal corresponding to the class value of the anchor reference signal. The embodiments of the present disclosure provide the method for measuring the beam applied to the millimeter wave communication process and/or the terahertz communication process.

In an embodiment of the present disclosure, the configuration information includes at least one of a time-frequency resource position of the at least one reference signal for the beam measurement, a first target value of a beam quality, a second target value of the beam quality, a class value of a specified anchor reference signal, a reporting condition of the beam measurement, or a measurement quantity of the beam measurement sent by the base station.

In an embodiment of the present disclosure, the apparatus is further configured to:

determine, based on a protocol agreement, a candidate time-frequency resource position corresponding to the reference signal; and determine a time-frequency resource position of each reference signal from the candidate time-frequency resource position.

In an embodiment of the present disclosure, the first sending module is further configured to:

send the configuration information to the UE through a signaling.

In an embodiment of the present disclosure, the obtaining module is further configured to:

obtain a measurement result of the anchor reference signal reported by the UE; and/or obtain a time domain resource position indication corresponding to the anchor reference signal reported by the UE; and/or obtain a class value of the anchor reference signal reported by the UE.

In an embodiment of the present disclosure, the apparatus is further configured to:

obtain updated data reported by the UE on an updated anchor reference signal corresponding to a class value of a reference signal anchored in an updated manner by the UE.

In an embodiment of the present disclosure, the apparatus is further configured to:

obtain a measurement result of the updated anchor reference signal reported by the UE;

obtain a time domain resource position indication corresponding to the updated anchor reference signal reported by the UE; or obtain a class value of the updated anchor reference signal reported by the UE.

In an embodiment of the present disclosure, the measurement quantity of the beam measurement includes at least one of:

a RSRP;

a RSRQ;

a SINR; or a RSSI.

Figure 11:
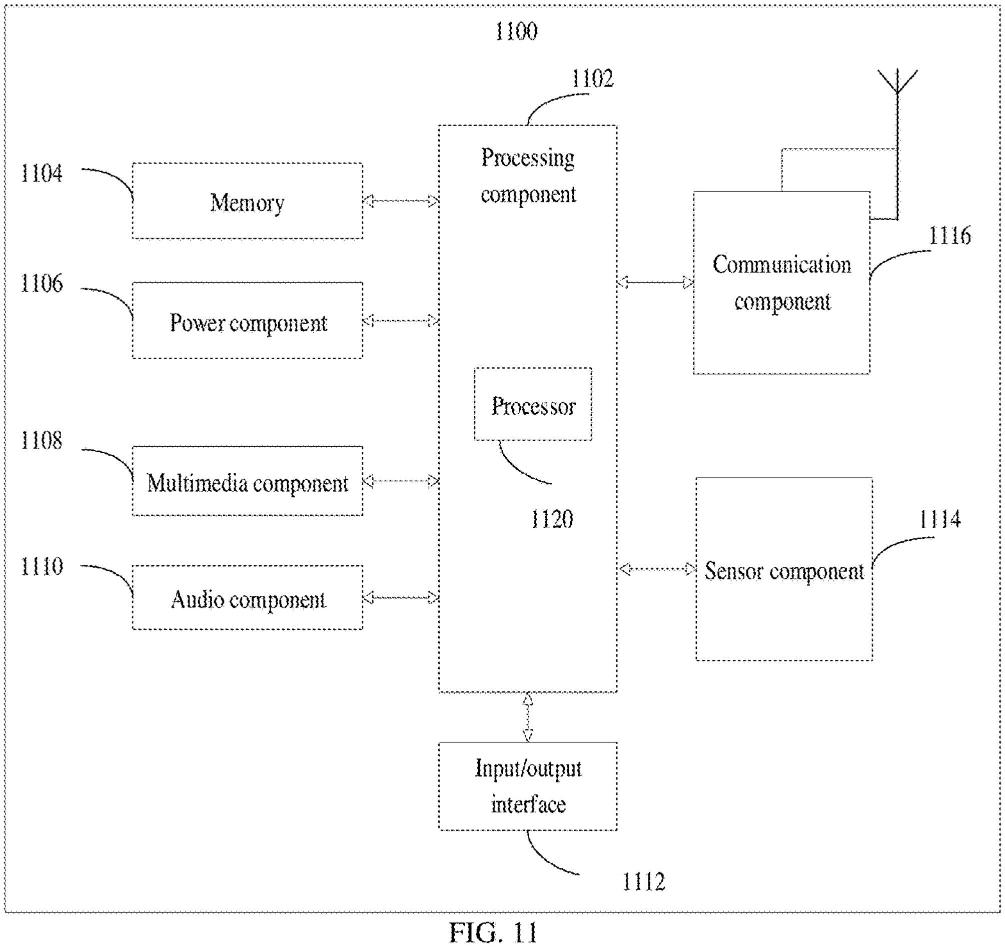
FIG. 11 is a block diagram of a user equipment provided by an embodiment of the present disclosure.

FIG. 11 is a block diagram of a User Equipment (UE) 1100 provided by an embodiment of the present disclosure. For example, the UE 1100 may be a mobile phone, a computer, a digital broadcast terminal device, a messaging device, a gaming console, a tablet, a medical device, an exercise device, a personal digital assistant, etc.

Referring to FIG. 11, the UE 1100 may include at least one of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the UE 1100, such as the operations associated with display, telephone calls, data communications, camera operations, and recording operations. The processing component 1102 may include at least one processor 1120 to execute instructions to perform all or part of the steps in the above described methods. Moreover, the processing component 1102 may include at least one module which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the UE 1100. Examples of such data include instructions for any applications or methods operated on the UE 1100, contact data, phonebook data, messages, pictures, video, etc. The memory 1104 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the UE 1100. The power component 1106 may include a power management system, at least one power source, and any other components associated with the generation, management, and distribution of power in the UE 1100.

The multimedia component 1108 includes a screen providing an output interface between the UE 1100 and the user. In some embodiments, the screen may include a liquid crystal display (LCD) and a touch panel (TP). If the screen includes the touch panel, the screen may be implemented as a touch screen to receive input signals from the user. The touch panel includes at least one touch sensor to sense touches, swipes, and gestures on the touch panel. The touch sensors may not only sense a boundary of a touch or swipe action, but also sense a wake-up time and a pressure associated with the touch or swipe action. In some embodiments, the multimedia component 1108 includes a front camera and/or a rear camera. The front camera and the rear camera may receive an external multimedia datum while the UE 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone (MIC) configured to receive an external audio signal when the UE 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes at least one sensor to provide state assessments of various aspects of the UE 1100. For instance, the sensor component 1114 may detect an open/closed state of the UE 1100, relative positioning of components, e.g., the display and the keypad, of the UE 1100, a change in position of the UE 1100 or a component of the UE 1100, a presence or absence of user contact with the UE 1100, an orientation or an acceleration/deceleration of the UE 1100, and a change in temperature of the UE 1100. The sensor component 1114 may include a proximity sensor configured to detect the presence of nearby objects without any physical contact. The sensor component 1114 may further include a light sensor, such as a CMOS or CCD image sensor, for use in imaging applications. In some embodiments, the sensor component 1114 may further include an accelerometer sensor, a gyroscope sensor, a magnetic sensor, a pressure sensor, or a temperature sensor.

The communication component 1116 is configured to facilitate communication, wired or wirelessly, between the UE 1100 and other devices. The UE 1100 may access a wireless network based on a communication standard, such as WiFi, 2G, or 3G, or a combination thereof. In an embodiment, the communication component 1116 receives a broadcast signal or broadcast associated information from an external broadcast management system via a broadcast channel. In an embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment of the present disclosure, the UE 1100 may be implemented with at least one application specific integrated circuit (ASIC), digital signal processor (DSP), digital signal processing device (DSPD), programmable logic device (PLD), field programmable gate array (FPGA), controller, micro-controller, microprocessor, or other electronic components, for performing the above described methods.

Figure 12:
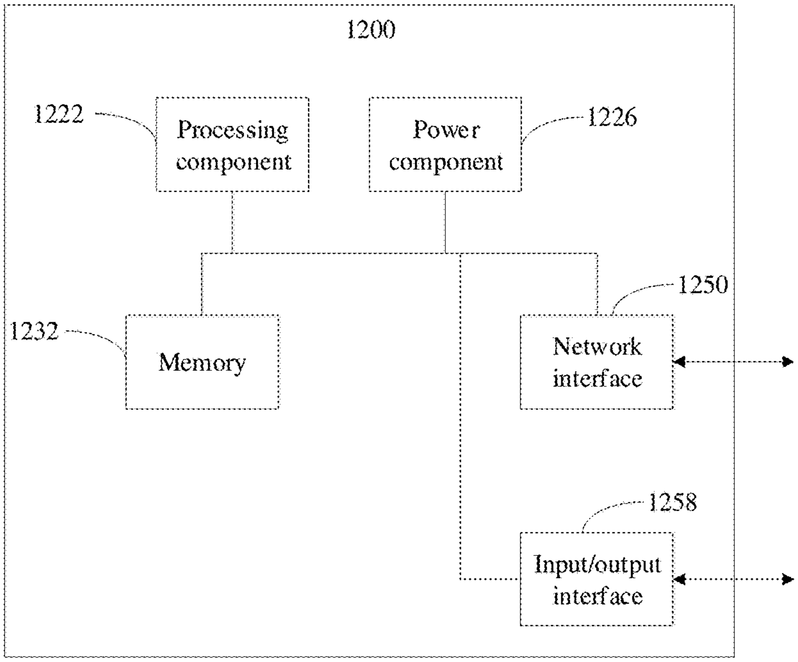
FIG. 12 is a block diagram of a network device provided by an embodiment of the present disclosure.
Figure 12:
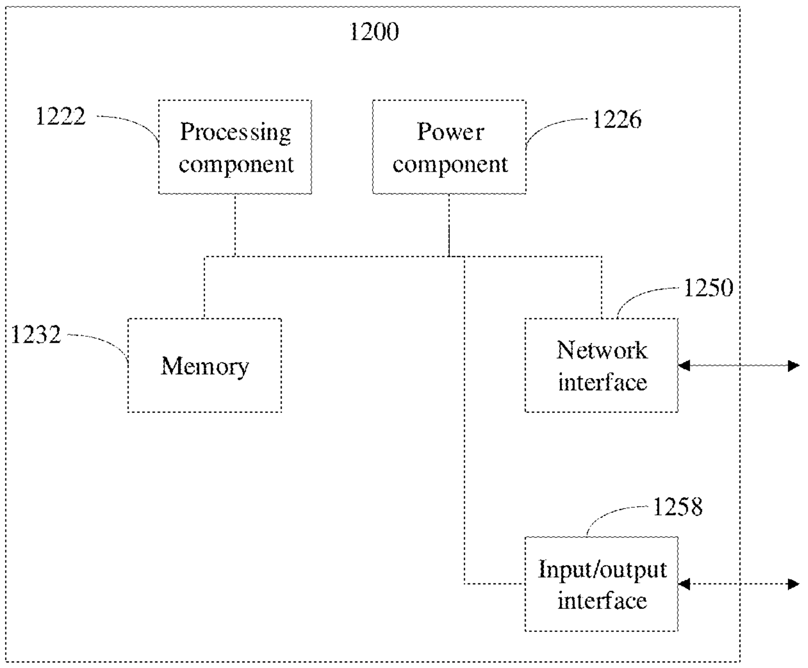

FIG. 12 is a block diagram of a network device 1200 provided by an embodiment of the present disclosure. For example, the network device 1200 may be provided as a base station. Referring to FIG. 12, the network device 1200 includes a processing component 1222, which further includes at least one processor and a memory resource represented by a memory 1232 for storing instructions executable by the processing component 1222, such as an application program. The application program stored in the memory 1232 may include one or more modules, each corresponding to a set of instructions. In addition, the processing component 1222 is configured to execute the instructions to execute the aforementioned any method applied on the network device, for example, the method shown in FIG. 5.

The network device 1200 may further include: a power component 1226 configured to perform power management of the network device 1200, a wired or wireless network interface 1250 configured to connect the network device 1200 to the network, and an input/output (I/O) interface 1258. The network device 1200 may operate an operating system stored in the memory 1232, such as Windows Server™, Mac OS X™, Unix™, Linux™, FreeBSD™, or the like.

In the above embodiments provided by the present disclosure, the methods provided by embodiments of the present disclosure are introduced from the perspectives of the network device and the UE. In order to achieve various functions of the methods provided in embodiments of the present disclosure, the network device and the UE may include hardware structures and software modules, and the various functions are implemented in the form of hardware structures, software modules, or hardware structures plus software modules. One of the various functions may be implemented in the form of hardware structures, software modules, or hardware structure plus software modules.

Embodiments of the present disclosure provide a communication device. The communication device may include a transceiver module and a processing module. The transceiver module may include a transmitting module and/or a receiving module. The transmitting module is configured to implement a transmission function, and the receiving module is configured to implement a reception function. The transceiver module may implement the transmission function and/or the reception function.

The communication device may be a terminal device (such as the terminal device in the above method embodiments), a device in the terminal device, or a device that can be used in conjunction with the terminal device. Alternatively, the communication device may be a network device, a device in the network device, or a device that can be used in conjunction with the network device.

Embodiments of the present disclosure provide another communication device. The communication device may be a network device, or may be a terminal device (such as the terminal device in the above method embodiments), or may be a chip, a chip system, a processor or the like that supports the network device to implement the above method, or may be a chip, a chip system, a processor or the like that supports the terminal device to implement the above method. The device can be used to implement the method described in the above method embodiments. For details, reference may be made to the description in the above method embodiments.

The communication device may include one or more processors. The processor may be a general-purpose processor or a dedicated processor, or the like. For example, the processor may be a baseband processor or a central processing unit. The baseband processor can be used to process communication protocols and communication data. The central processor can be used to control the communication devices (such as network devices, baseband chips, terminal devices, terminal device chips, DU or CU, or the like), execute computer programs, and process data for the computer programs.

In embodiments of the present disclosure, the communication device may further include one or more memories, on which a computer program may be stored. The processor executes the computer program, so that the communication device performs the method described in the above method embodiments. In embodiments of the present disclosure, the memory may also store data. The communication device and the memory can be provided separately or integrated together.

In embodiments of the present disclosure, the communication device may further include a transceiver and an antenna. The transceiver may be referred to as a transceiver unit, a transceiver, a transceiver circuit, or the like, and is used to implement transceiver functions. The transceiver may include a receiver and a transmitter. The receiver may be referred to as a receiver or a receiving circuit, or the like, and is used to implement the receiving function; and the transmitter may be referred to as a transmitter, a transmitting circuit, or the like, and is used to implement the transmitting function.

In embodiments of the present disclosure, the communication device may further include one or more interface circuits. The interface circuit is used to receive code instructions and transmit the code instructions to the processor. The processor executes the code instructions to cause the communication device to perform the method described in the above method embodiments.

The communication device is a terminal device (such as the terminal device in the foregoing method embodiments), and the processor is configured to execute the method shown in any one of FIGS. 1-4.

The communication device is a network device, and the transceiver is configured to execute the method shown in any one of FIGS. 5-8.

In an implementation of the present disclosure, the processor may include a transceiver for implementing receiving and transmitting functions. For example, the transceiver may be a transceiver circuit, an interface, or an interface circuit. The transceiver circuits, interfaces or interface circuits used to implement the receiving and transmitting functions can be separate or integrated together. The above-mentioned transceiver circuit, interface or interface circuit can be used for reading and writing codes/data, or the above-mentioned transceiver circuit, interface or interface circuit can be used for signal transmission or transfer.

In an implementation of the present disclosure, the processor may be stored with a computer program, and the computer program is executed by the processor, causing the communication device to perform the method described in the above method embodiments. The computer program may be solidified in the processor, in which case the processor may be implemented by hardware.

In an implementation of the present disclosure, the communication device may include a circuit, and the circuit may implement the functions of sending or receiving or communicating in the foregoing method embodiments. The processors and transceivers described in the present disclosure may be implemented on an integrated circuit (IC), an analog IC, a radio frequency integrated circuit (RFIC), a mixed signal IC, an application specific integrated circuit (ASIC), a printed circuit boards (PCB), an electronic device, and the like. The processor and transceiver can also be manufactured using various IC process technologies, such as complementary metal oxide semiconductor (CMOS), N-type metal oxide semiconductor (nMetal-oxide-semiconductor, NMOS), P-type metal oxide semiconductor (positive channel metal oxide semiconductor, PMOS), bipolar junction transistor (BJT), bipolar CMOS (BiCMOS), silicon germanium (SiGe), gallium arsenide (GaAs), and the like.

The communication device described in the above embodiments may be the network device or the terminal device (e.g., the terminal device in the above method embodiments), but the scope of the communication device described in the present disclosure is not limited thereto, and the structure of the communication device may not be limited. The communication device may be a stand-alone device or may be part of a larger device. For example, the communication device may be:

(1) a stand-alone integrated circuit IC, or chip, or chip system or subsystem;
(2) a set of one or more ICs. In embodiments of the present disclosure, the IC set may further include storage components for storing data and computer programs;
(3) an ASIC, such as a modem;
(4) a module that can be embedded in another device;
(5) a receiver, a terminal device, an intelligent terminal device, a cellular phone, a wireless device, a handheld device, a mobile unit, a vehicle-mounted device, a network device, a cloud device, an artificial intelligence device, and the like;
(6) others, etc.

In a case that the communication device may be a chip or a system on a chip, the chip includes a processor and an interface. The number of processors may be one or more, and the number of interfaces may be multiple.

In an embodiment of the present disclosure, the chip further includes a memory, and the memory is configured to store necessary computer programs and data.

Those skilled in the art can also understand that the various illustrative logical blocks and steps listed in the embodiments of the present disclosure can be implemented by electronic hardware, computer software, or a combination of both. Whether such functionality is implemented in hardware or software depends on the specific application and overall system design requirements. Those skilled in the art can use various methods to implement the described functions for each specific application, but such implementation should not be understood as exceeding the scope of protection of the embodiments of the present disclosure.

Embodiments of the present disclosure further provide a system for measuring a beam. The system includes the communication device as the terminal device (such as the terminal device in the above method embodiments) and the communication device as the network device in the above embodiments, or the system includes the communication device as the terminal device (such as the terminal device in the above method embodiments) and the communication device as the network device in the above embodiments.

The present disclosure further provides a readable storage medium on which instructions are stored. When the instructions are executed by a computer, the functions of any of the above method embodiments are implemented.

The present disclosure further provides a computer program product, which, when been executed by a computer, implements the functions of any of the above method embodiments.

In the above embodiments, it may be implemented in whole or in part by software, hardware, firmware, or any combination thereof. When implemented by software, it may be implemented in whole or in part in the form of a computer program product. The computer program product includes one or more computer programs. When the computer program is loaded and executed on a computer, the processes or functions described in accordance with the embodiments of the present disclosure are generated in whole or in part. The computer may be a general-purpose computer, a dedicated computer, a computer network, or other programmable device. The computer program may be stored in a computer-readable storage medium, or been transferred from one computer-readable storage medium to another, for example, the computer program may be transferred from a website, computer, server, or data center to another website, computer, server or data center via wired (such as coaxial cable, optical fiber, digital subscriber line (DSL)) or wireless (such as infrared, wireless, microwave, or the like) means. The computer-readable storage medium may be any available medium that can be accessed by a computer, or a data storage device such as an integrated server, data center, or the like, that includes one or more available media. The available media may be magnetic media (e.g., floppy disks, hard disks, magnetic tapes), optical media (e.g., high-density digital video discs (DVD)), or semiconductor media (e.g., solid state disks, SSD)) or the like.

Those of ordinary skill in the art can understand that the first, second, and other numerical numbers involved in the present disclosure are only distinctions made for convenience of description and are not used to limit the scope of the embodiments of the disclosure, nor to indicate the order.

At least one in the present disclosure can also be described as one or more, and the plurality can be two, three, four or more, which is not limited in the present disclosure. In the embodiment of the present disclosure, for one type of technical feature, “first”, “second”, “third”, “A”, “B”, “C” and “D”, or the like are used to distinguish the technical features in the type of technical feature, and the technical features described with “first”, “second”, “third”, “A”, “B”, “C” and “D” are in no order of precedence or order of size.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including the common general knowledge or habitual technical means in the technical field not disclosed in the present disclosure. The specification and embodiments are considered as exemplary only, and a true scope and spirit of the present disclosure is indicated by the appending claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for measuring a beam, performed by a User Equipment (UE), and comprising:

obtaining configuration information sent by a base station;

obtaining, based on the configuration information, at least one reference signal sent by the base station, determining a class value corresponding to the at least one reference signal, and performing beam measurement for the at least one reference signal to obtain a measurement result, wherein the class value is correlated with a beam bandwidth of the reference signal; and determining, based on at least one of the measurement result of the reference signal or the configuration information, a class value of an anchor reference signal, and performing at least one of the beam measurement or data reporting by anchoring on an anchor reference signal corresponding to the class value of the anchor reference signal.

2. The method according to claim 1, wherein the configuration information comprises at least one of a time-frequency resource position of the at least one reference signal for the beam measurement, a first target value of a beam quality, a second target value of the beam quality, a class value of a specified anchor reference signal, a reporting condition of the beam measurement, or a measurement quantity of the beam measurement.

3. The method according to claim 2, wherein the obtaining, based on the configuration information, the at least one reference signal sent by the base station comprises:

obtaining, based on the time-frequency resource position of the at least one reference signal, the at least one reference signal sent by the base station.

4. The method according to claim 2, wherein the determining the class value of the anchor reference signal based on the at least one of the measurement result of the reference signal or the configuration information comprises:

determining the class value of the anchor reference signal based on a magnitude relationship between measurement results of reference signals of different classes and the first target value of the beam quality and the second target value of the beam quality.

5. The method according to claim 4, wherein the class value is negatively correlated with the beam bandwidth of the reference signal, and the determining the class value of the anchor reference signal based on the magnitude relationship between the measurement results of the reference signals of different classes and the first target value of the beam quality and the second target value of the beam quality comprises:

if a first reference signal among all reference signals whose measurement result is greater than or equal to the first target value of the beam quality and smaller than the second target value of the beam quality exists, selecting a class value of the first reference signal as the class value of the anchor reference signal;

if a measurement result of a reference signal with a largest class value among all the reference signals is smaller than the first target value of the beam quality, performing a first operation, wherein the first operation comprises at least one of selecting the largest class value as the class value of the anchor reference signal, performing cell reselection, or sending a handover request to the base station; and if a measurement result of a reference signal with a smallest class value among all the reference signals is greater than or equal to the second target value of the beam quality, selecting the smallest class value as the class value of the anchor reference signal; or wherein the class value is positively correlated with the beam bandwidth of the reference signal, and the determining the class value of the anchor reference signal based on the magnitude relationship between the measurement results of the reference signals of different classes and the first target value of the beam quality and the second target value of the beam quality comprises:

if a first reference signal among all reference signals whose measurement result is greater than or equal to the first target value of the beam quality and smaller than the second target value of the beam quality exists, selecting a class value of the first reference signal as the class value of the anchor reference signal;

if a measurement result of a reference signal with a smallest class value among all the reference signals is smaller than the first target value of the beam quality, performing a second operation, wherein the second operation comprises at least one of selecting the smallest class value as the class value of the anchor reference signal, performing cell reselection, or sending a handover request to the base station; and if a measurement result of a reference signal with a largest class value among all the reference signals is greater than or equal to the second target value of the beam quality, selecting the largest class value as the class value of the anchor reference signal.

6. The method according to claim 2, wherein the determining the class value of the anchor reference signal based on the at least one of the measurement result of the reference signal or the configuration information comprises:

selecting the class value of the specified anchor reference signal as the class value of the anchor reference signal; and wherein the performing the data reporting by anchoring on the anchor reference signal corresponding to the class value of the anchor reference signal comprises:

based on the reporting condition of the beam measurement, reporting, on a beam of the anchor reference signal, at least one of following data to the base station:

a measurement result of the anchor reference signal;

a time domain resource position indication corresponding to the anchor reference signal; or the class value of the anchor reference signal.

7. The method according to claim 2, wherein the measurement quantity of the beam measurement comprises at least one of:

a Reference Signal Receiving Power (RSRP);

a Reference Signal Receiving Quality (RSRQ);

a Signal to Interference plus Noise Ratio (SINR); or a Received Signal Strength Indication (RSSI).

8. The method according to claim 1, wherein the determining the class value corresponding to the at least one reference signal comprises:

if the UE is in an idle state or an initial access state, determining the class value corresponding to the at least one reference signal based on a protocol agreement; and if the UE is in a connected state, obtaining the class value of the at least one reference signal sent by the base station.

9. The method according to claim 1, further comprising:

updating the anchor reference signal according to a measurement result of the anchor reference signal, and performing the at least one of the beam measurement or the data reporting by anchoring on an updated anchor reference signal corresponding to a class value of the updated anchor reference signal.

10. The method according to claim 9, wherein the updating the anchor reference signal according to the measurement result of the anchor reference signal comprises:

updating the anchor reference signal based on a magnitude relationship between the measurement result of the anchor reference signal and a first target value of a beam quality and a second target value of the beam quality.

11. The method according to claim 10, wherein the class value is negatively correlated with the beam bandwidth of the reference signal; and the updating the anchor reference signal based on the magnitude relationship between the measurement result of the anchor reference signal and the first target value of the beam quality and the second target value of the beam quality comprises:

if the measurement result of the anchor reference signal is greater than or equal to the second target value of the beam quality, updating the class value of the anchor reference signal, wherein the class value of the anchor reference signal after the updating is smaller than the class value of the anchor reference signal before the updating; and if the measurement result of the anchor reference signal is smaller than the first target value of the beam quality, updating the class value of the anchor reference signal, wherein the class value of the anchor reference signal after the updating is greater than the class value of the anchor reference signal before the updating; or wherein the class value is positively correlated with the beam bandwidth of the reference signal; and the updating the anchor reference signal based on the magnitude relationship between the measurement result of the anchor reference signal and the first target value of the beam quality and the second target value of the beam quality comprises:

if the measurement result of the anchor reference signal is greater than or equal to the second target value of the beam quality, updating the class value of the anchor reference signal, wherein the class value of the anchor reference signal after the updating is greater than the class value of the anchor reference signal before the updating; and if the measurement result of the anchor reference signal is smaller than the first target value of the beam quality, updating the class value of the anchor reference signal, wherein the class value of the anchor reference signal after the updating is smaller than the class value of the anchor reference signal before the updating.

12. The method according to claim 9, wherein the performing the data reporting by anchoring on the updated anchor reference signal corresponding to the class value of the updated anchor reference signal comprises:

based on a reporting condition of the beam measurement, reporting, on a beam of the updated anchor reference signal, at least one of the following data to the base station:

a measurement result of the updated anchor reference signal;

a time domain resource position indication corresponding to the updated anchor reference signal; or the class value of the updated anchor reference signal.

13. A method for measuring a beam, performed by a base station, and comprising:

sending configuration information;

sending at least one reference signal, wherein the at least one reference signal has a corresponding class value, and the class value is correlated with a beam bandwidth of the reference signal; and obtaining data reported by a User Equipment (UE) on an anchor reference signal corresponding to a class value of a reference signal anchored by the UE.

14. The method according to claim 13, wherein the configuration information comprises at least one of a time-frequency resource position of the at least one reference signal for the beam measurement, a first target value of a beam quality, a second target value of the beam quality, a class value of a specified anchor reference signal, a reporting condition of the beam measurement, or a measurement quantity of the beam measurement.

15. The method according to claim 14, further comprising:

determining, based on a protocol agreement, a candidate time-frequency resource position corresponding to the reference signal; and determining a time-frequency resource position of each reference signal from the candidate time-frequency resource position.

16. The method according to claim 14, wherein the measured quantity of the beam measurement comprises at least one of:

a RSRP;

a RSRQ;

a SINR; or a RSSI.

17. The method according to claim 13, wherein the obtaining the data reported by the UE on the anchor reference signal corresponding to the class value of the reference signal anchored by the UE comprises at least one of:

obtaining a measurement result of the anchor reference signal reported by the UE;

obtaining a time domain resource position indication corresponding to the anchor reference signal reported by the UE; or obtaining a class value of the anchor reference signal reported by the UE.

18. The method according to claim 13, further comprising:

obtaining updated data reported by the UE on an updated anchor reference signal corresponding to a class value of a reference signal anchored in an updated manner by the UE, wherein the obtaining the updated data comprises at least one of:

obtaining a measurement result of the updated anchor reference signal reported by the UE;

obtaining a time domain resource position indication corresponding to the updated anchor reference signal reported by the UE; or obtaining a class value of the updated anchor reference signal reported by the UE.

19. A communication device, comprising:

a processor; and a memory storing a computer program executable by the processor, wherein the processor is configured to perform the method according to claim 13.

20. A communication device, comprising:

a processor; and a memory storing a computer program executable by the processor, wherein the processor is configured to:

obtain configuration information sent by a base station;

obtain, based on the configuration information, at least one reference signal sent by the base station, determine a class value corresponding to the at least one reference signal, and perform beam measurement for the at least one reference signal to obtain a measurement result, wherein the class value is correlated with a beam bandwidth of the reference signal; and determine, based on at least one of the measurement result of the reference signal or the configuration information, a class value of an anchor reference signal, and perform at least one of the beam measurement or data reporting by anchoring on an anchor reference signal corresponding to the class value of the anchor reference signal.

* * * * *